J. FLYNN.
APPARATUS FOR REPAIRING PNEUMATIC TIRES.
APPLICATION FILED JULY 19, 1920.
1,371,779.
Patented Mar. 15, 1921.
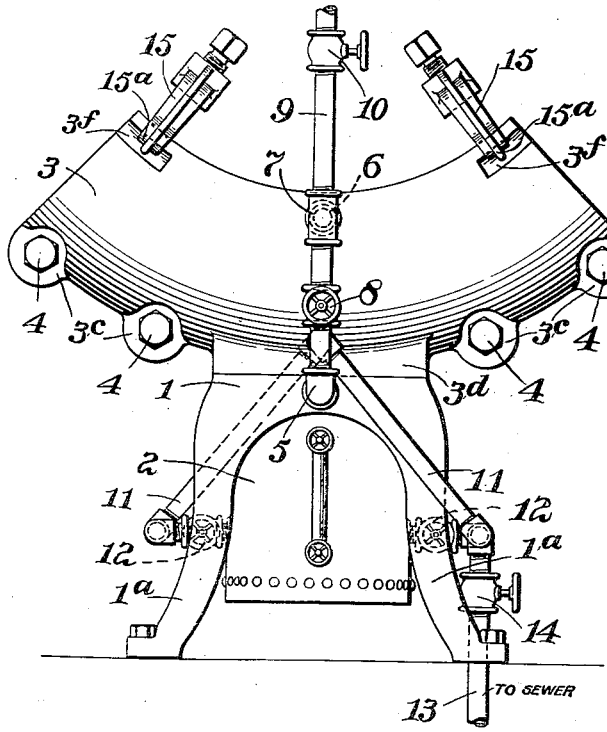
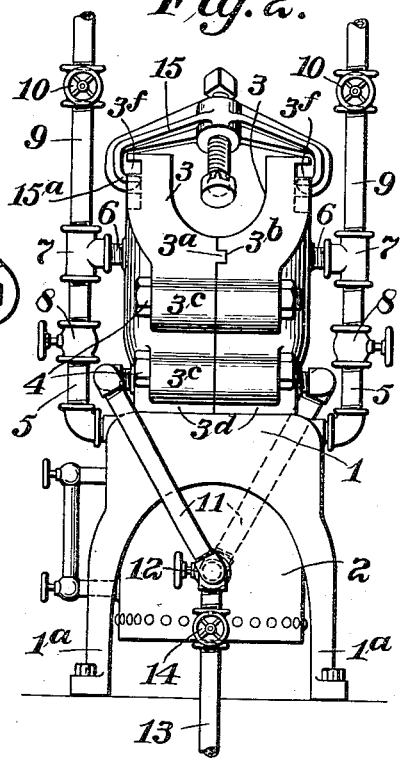
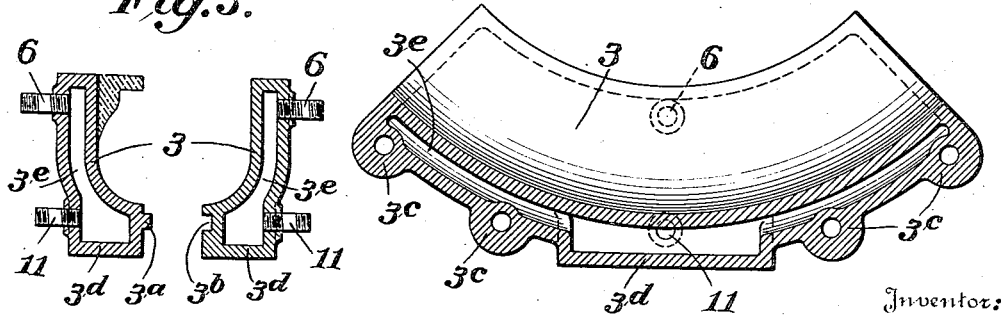
Inventor:
John Flynn,

UNITED STATES PATENT OFFICE.

JOHN FLYNN, OF AKRON, OHIO, ASSIGNOR TO THE WILLIAMS FOUNDRY & MACHINE CO., OF AKRON, OHIO, A CORPORATION OF OHIO.

APPARATUS FOR REPAIRING PNEUMATIC TIRES.

1,371,779.  Specification of Letters Patent.  Patented Mar. 15, 1921.

Application filed July 19, 1920. Serial No. 397,348.

*To all whom it may concern:*

Be it known that I, JOHN FLYNN, a citizen of the United States, and a resident of Akron, in the county of Summit and State of Ohio, have invented certain new and useful Improvements in Apparatus for Repairing Pneumatic Tires, of which the following is a specification.

My invention relates to improvements in apparatus designed for vulcanizing patches upon the exterior of the outer tubes, casings or shoes of double tube pneumatic tires, and is designed more particularly for making repairs on extra large casings which are commonly known as "giant truck tires." In such tires, owing to the extreme thickness of the rubber covering, difficulty has been experienced in curing the rubber, the crust having a tendency to overcure while uncured or raw rubber is left on the inside.

My invention aims to provide a construction in which the part to be vulcanized may be subjected to even or equal cure.

My invention further aims to provide an apparatus for making repairs on tire shoes or casings in which either side of the casing may be subjected to the proper temperature without affecting the other side, or both sides and tread may be vulcanized at the same time as desired.

The invention also aims to provide a construction in which a part or all of the mold may be quickly cooled, and in which also a part of the mold may be maintained cool while another part is heated to effect the cure.

With these and other objects in view the invention includes the novel features of construction and arrangement and combination of parts hereinafter described and particularly defined by the appended claims.

An embodiment of the invention is illustrated in the accompanying drawings, in which:

Figure 1 is a side elevation of my repair apparatus.

Fig. 2 is an end view.

Fig. 3 is a transverse section through the two mold sections showing the same separated, and Fig. 4 is an inside face view of one of the sections.

Referring by reference characters to this drawing the numeral 1 designates a suitable stand or support provided with supporting legs $1^a$ between which is supported in any suitable manner a steam generator or boiler, indicated at 2. As this boiler forms, *per se*, no part of the present invention, it is only shown conventionally.

Removably mounted upon this stand is a pair of mold sections 3 which are duplicates of each other and which are shown in detail in Figs. 3 and 4.

These are so shaped that when placed in juxtaposition they form a channeled mold section with an inside face curved both transversely and longitudinally to conform to the exterior surface of the tire. The adjoining faces of the sections are preferably provided with registering tongues and grooves as indicated at $3^a$ and $3^b$ respectively (Figs. 3 and 4) and the sections are secured together by bolts 4 passing through bolt holes in the lugs $3^c$ which are formed integral with the sections.

The sections are further provided on their lower faces with enlargements $3^d$ which together form a rectangular boss or projection which fits a corresponding seat in the top of the stand or support 1.

The sections are made hollow so as to provide spaces or chambers in the walls thereof as indicated at $3^e$.

Pipes 5 leading from the top or steam space of the boiler on opposite sides, extend upwardly as shown in Figs. 1 and 2, and are connected by branch pipes 6 with these spaces through the T-couplings 7, suitable valves 8 being provided by which the steam may be turned on or cut off at will. To the T-couplings 7 are also connected the pipes 9 which lead to a source of cooling medium under requisite pressure, such as cold water for example, and these pipes are provided with cut-off valves 10. Drain or return pipes 11 lead from the bottoms of the chambers $3^e$ to the lower part of the boiler, being provided with cut off valves 12, and these pipes also have branches 13 by which the cooling water may be drained off, such branches having cut off valves 14. In order to apply requisite pressure to the inside of the casing undergoing vulcanization I provide the mold sections 3 with recesses $3^f$ in their upper outer edges which are designed to be engaged by lugs $15^a$ on the ends of yokes 15 through which pass pressure screws by means of which pressure may be applied to the inside of the tire through the medium of the ordinary sand bag or the like.

Having thus described my invention, what I claim is:

1. A tire repair mold comprising a pair of arc-shaped sections adapted when placed in contact with each other to provide an open tire receiving channel, said sections having independent chambers in the opposite walls thereof, means for supporting said mold with the open face of the channel uppermost, and means for supplying heating and cooling media at will to either of said chambers.

2. In combination, a suitable stand or support, a mold carrier thereby having a tire receiving cavity, said mold having independent chambers on opposite sides, a stand supporting said sections, a boiler supported by said stand, independent steam pipes leading from said boiler to said chambers, independent drain pipes connected with said chambers, and independent water supply pipes also connected with said chambers.

3. In combination, a mold having a tire cavity, said mold being divided along the median line longitudinally of the cavity, said sections having interengaging tongues and grooves, and having independent chambers in the walls thereof, means for clamping said sections together, and independent pipe connections to said chambers.

In testimony whereof, I affix my signature.

JOHN FLYNN.